United States Patent
Gross et al.

(10) Patent No.: US 7,292,659 B1
(45) Date of Patent: Nov. 6, 2007

(54) CORRELATING AND ALIGNING MONITORED SIGNALS FOR COMPUTER SYSTEM PERFORMANCE PARAMETERS

(75) Inventors: Kenneth C. Gross, San Diego, CA (US); Vatsal Bhardwaj, Seattle, WA (US); David M. Fishman, Sunnyvale, CA (US); Lawrence G. Votta, Jr., Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 773 days.

(21) Appl. No.: 10/671,705

(22) Filed: Sep. 26, 2003

(51) Int. Cl.
*H03D 1/00* (2006.01)
*H04L 27/06* (2006.01)

(52) U.S. Cl. ............ 375/343; 375/142; 375/150; 714/819

(58) Field of Classification Search ............ 714/25, 714/37, 48, 799, 819; 375/142, 150; 975/343
See application file for complete search history.

(56) References Cited

U.S. PATENT DOCUMENTS

| | | | |
|---|---|---|---|
| 4,937,763 A | 6/1990 | Mott | 364/550 |
| 6,046,988 A * | 4/2000 | Schenkel et al. | 370/254 |
| 6,906,320 B2 * | 6/2005 | Sachs et al. | 250/282 |
| 2003/0208286 A1 * | 11/2003 | Abercrombie | 700/31 |
| 2003/0231714 A1 * | 12/2003 | Kjeldsen et al. | 375/259 |
| 2005/0252884 A1 * | 11/2005 | Lam et al. | 216/59 |

OTHER PUBLICATIONS

Publication entitled "Use of Kernel Based Techniques for Sensor Validation in Nuclear Power Plants", by Andrei V. Gribok et al., International Topical Meeting on Nuclear Plant Instrumentation, Controls, and Human-Machine Interface Technologies, NPIC &HMIT 2000, Washington DC, Nov. 2000.

* cited by examiner

*Primary Examiner*—Curtis B. Odom
(74) *Attorney, Agent, or Firm*—Park, Vaughan & Fleming, LLP

(57) ABSTRACT

One embodiment of the present invention provides a system that facilitates aligning a first signal with a second signal in a manner that optimizes a correlation between the first signal and the second signal. The system starts by receiving a set of signals, including the first signal and the second signal. The system then determines a correlation between the first signal and the second signal. Next, the system adjusts an alignment between the first signal and again determines a correlation between the first signal and the second signal. If the correlation is greater with the alignment adjustment, the system adjusts the alignment between the first signal and the second signal. This process of adjusting the alignment is repeated for different alignments to find an optimal alignment. Hence, the present invention operates effectively for signal sources which may be independently speeding up and slowing down with respect to each other while under surveillance.

36 Claims, 4 Drawing Sheets

CORRELATING AND ALIGNING MONITORED SIGNALS FOR COMPUTER SYSTEM PERFORMANCE PARAMETERS

BACKGROUND

1. Field of the Invention

The present invention relates to signal processing. More specifically, the present invention relates to a method and an apparatus that correlates and aligns signals for computer system performance parameters.

2. Related Art

The increasing complexity of server systems pressures support services on two fronts. First, it increases support cycle times. Second, it drives up the cost of labor, both in time-per-support incident, and in the acquisition costs of expertise. While many costly system flaws exhibit subtle signs before the customer experiences a problem or an outage, these indicators are difficult to discern and more difficult to match to impending problems.

Fault detection in complex systems typically requires costly on-line monitoring and expertise. Conventional approaches to identifying faults, which combine event correlation and threshold-based rules, have proven inadequate in a variety of safety-critical industries with complex, heterogeneous subsystem inputs not dissimilar to those from enterprise computing. Fundamentally, while many high-end servers are already rich in instrumentation, the data produced by the instrumentation are complex, non-uniform, and difficult to correlate. Improved real-time monitoring of system performance metrics, coupled with an improved Fault Management Architecture (FMA), provide key enabling technologies that can help in proactively identifying incipient faults and decreasing support costs.

Some systems apply pattern recognition techniques to continuously monitored computer system performance parameters to identify faults. However, the effectiveness of pattern recognition in discerning incipient faults in noisy process data is highly dependent on the quality of information available from the instrumentation.

One challenge that has arisen in connection with the above objectives is deciding which signals are most valuable to monitor. Current high-end servers can have more than 1,000 variables that can be potentially monitored by real-time surveillance systems. It would be neither practical, nor prudent, to just "monitor everything."

One method for monitoring as many signals as possible is to correlate the signals and combine them into one signal that can be monitored by a pattern recognition system. However, in many high-end servers, the monitored signals are non-synchronous. Processes can speed up and slow down depending on many factors. Over time, signals generated by different processes can drift even further out of phase, which can greatly complicate the process of correlating the signals.

Furthermore, in large server computer systems, the monitored signals typically fall into a number of correlated groups. Signals within a given group are correlated with each other. However, there is little correlation between signals belonging to different groups. In order to efficiently correlate the signals, it is desirable to first "cluster" the signals into their respective correlated groups.

Hence, what is needed is a method and apparatus for correlating and clustering signals from numerous sources within a computer system, sources that are not only characterized by non-synchronous sampling intervals, but which may also be independently speeding up and slowing down while under surveillance.

SUMMARY

One embodiment of the present invention provides a system that facilitates aligning a first signal with a second signal in a manner that optimizes a correlation between the first signal and the second signal. The system starts by receiving a set of signals, including the first signal and the second signal. The system then determines a correlation between the first signal and the second signal. Next, the system adjusts an alignment between the first signal and again determines a correlation between the first signal and the second signal. If the correlation is greater with the alignment adjustment, the system adjusts the alignment between the first signal and the second signal. This process of adjusting the alignment is repeated for different alignments to find an optimal alignment. Hence, the present invention operates effectively for signal sources which may be independently speeding up and slowing down with respect to each other while under surveillance.

In a variation on this embodiment, the system subsequently combines the first signal and the second signal into a combined signal.

In a variation on this embodiment, the first signal comprises a combination of signals that have been aligned to optimize correlation.

In a further variation on this embodiment, the system removes a signal from the combination of signals that has the lowest correlation with other signals in the combination of signals.

In yet a further variation, after removing the signal, the system re-optimizes the correlation of each signal in the combination of signals with other signals in the combination of signals.

In a further variation on this embodiment, the system predicts a given signal in the combination of signals by using a correlation of the given signal with other signals in the combination of signals.

In yet a further variation on this embodiment, the system measures a given signal and compares the measured signal with a prediction for the given signal. The system determines that the given signal is faulty if the measured signal does not substantially match the predicted signal.

In a further variation on this embodiment, the system discards a signal that is completely correlated with another signal in the combination of signals.

In a variation on this embodiment, determining the correlation between the first signal and the second signal involves correlating a window of data points from the first signal with a window of data points from the second signal. In this variation, the process of adjusting the alignment involves sliding the window along the second signal, until correlation is maximized with the window for the first signal.

In a further variation on this embodiment, the system adjusts the window size during the alignment process.

In a variation on this embodiment, prior to determining a correlation between the first signal and the second signal, the system performs an analytical re-sampling operation, which uses interpolation to add data points to the first signal and/or second signal to ensure that each signal has the same number of data points and that the intervals between points are equal between the first and second signal.

In a variation on this embodiment, the system additionally performs a clustering operation on the set of signals to cluster the signals into one or more correlated groups of signals.

In a further variation, the system only attempts to align signals that belong to the same correlated group of signals.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs). Note that this does not include computer instruction signals embodied in a transmission medium.

Real-Time Telemetry System with Correlated Alignment-Optimized Signals

Figure 1:
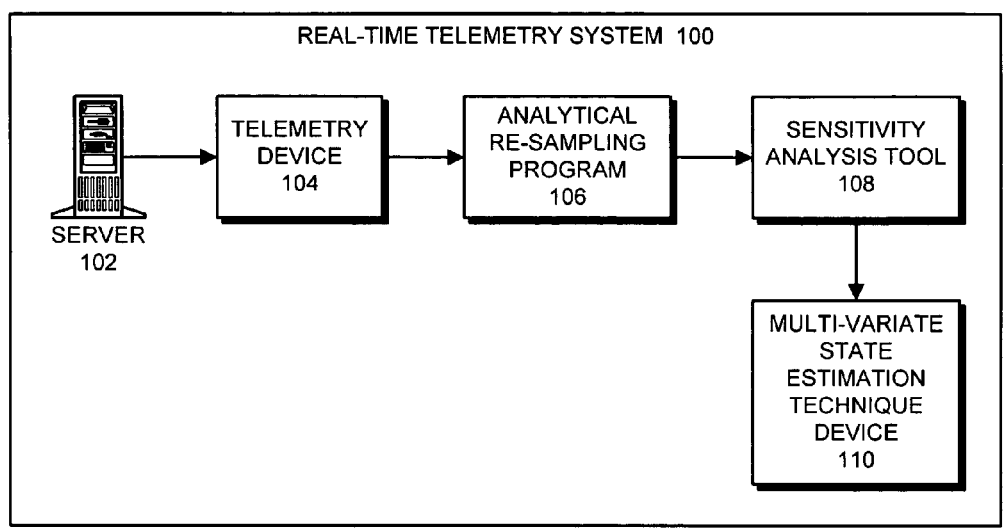
FIG. 1 illustrates a real-time telemetry system with correlated and aligned signals in accordance with an embodiment of the present invention.

FIG. 1 illustrates real-time telemetry system 100 with correlated and aligned signals in accordance with an embodiment of the present invention. Real-time telemetry system 100 contains server 102. Server 102 can generally include any computational node including a mechanism for servicing requests from a client for computational and/or data storage resources. In the present embodiment, server 102 is a high-end uniprocessor or multiprocessor server that is being monitored by real-time telemetry system 100.

Real-time telemetry system 100 also contains telemetry device 104, analytical re-sampling program 106, sensitivity analysis tool 108, and multi-variate state estimation technique (MSET) device 110. Telemetry device 104 gathers information from the various sensors and monitoring tools within server 102, and directs the signals to a remote location that contains analytical re-sampling program 106, sensitivity analysis tool 108, and MSET device 110.

The term "MSET" as used in this specification refers to a multivariate state estimation technique, which loosely represents a class of pattern recognition algorithms. For example, see [Gribok] "Use of Kernel Based Techniques for Sensor Validation in Nuclear Power Plants," by Andrei V. Gribok, J. Wesley Hines, and Robert E. Uhrig, *The Third American Nuclear Society International Topical Meeting on Nuclear Plant Instrumentation and Control and Human-Machine Interface Technologies*, Washington D.C., Nov. 13-17, 2000. This paper outlines several different pattern recognition approaches. Hence, the term "MSET" as used in this specification can refer to (among other things) any technique outlined in [Gribok], including Ordinary Least Squares (OLS), Support Vector Machines (SVM), Artificial Neural Networks (ANNs), MSET, or Regularized MSET (RMSET).

Analytical re-sampling program 106 ensures that the signals have a uniform sampling rate. In doing so, analytical re-sampling program 106 uses interpolation techniques, if necessary, to fill in missing data points, or to equalize the sampling intervals when the raw data is non-uniformly sampled.

After the signals pass through analytical re-sampling program 106, they are aligned and correlated by sensitivity analysis tool 108. Although the approach used by sensitivity analysis tool 108 is similar to conventional stepwise regression, sensitivity analysis tool 108 incorporates a novel moving window technique that "slides" through the signals with systematically varying window widths. The sliding windows systematically vary the alignment between windows for different signals to optimize the degree of association between the signals, as quantified by an "F-statistic," which is computed and ranked for all signal windows by sensitivity analysis tool 108.

For statistically comparing the quality of two fits, F-statistics reveal the measure of regression. The higher the value of the F-statistic, the better the correlation is between two signals. The lead/lag value for the sliding window that results in the F-statistic with the highest value is chosen, and the candidate signal is aligned to maximize this value. This process is repeated for each signal by sensitivity analysis tool 108.

Signals that have an F-statistic very close to 1 are "completely correlated" and can be discarded. This can result when two signals are measuring the same metric, but are expressing them in different engineering units. For example, a signal can convey a temperature in degrees Fahrenheit, while a second signal conveys the same temperature in degrees Centigrade. Since these two signals are perfectly correlated, one does not contain any additional information over the other, and therefore, one may be discarded.

Some signals may exhibit little correlation, or no correlation whatsoever. In this case, these signals may be dropped as they add little predictive value. Once a highly correlated subset of the signals has been determined, they are combined into one group or cluster for processing by the MSET device 110.

MSET device 110 runs the group of signals through a pattern recognition process. Since the signals are correlated, MSET device 110 can predict what each signal should be from the other signals. MSET device 110 then uses pattern recognition to produce a predicted pattern for each signal. If one of the signals substantially deviates from the predicted pattern, MSET device 110 signals that a faulty signal has been detected. Note that faulty signals can be used to predict impending failure and to thereby facilitate proactively replacing components before they completely fail.

Real-Time Telemetry System with Clustering

Figure 2:
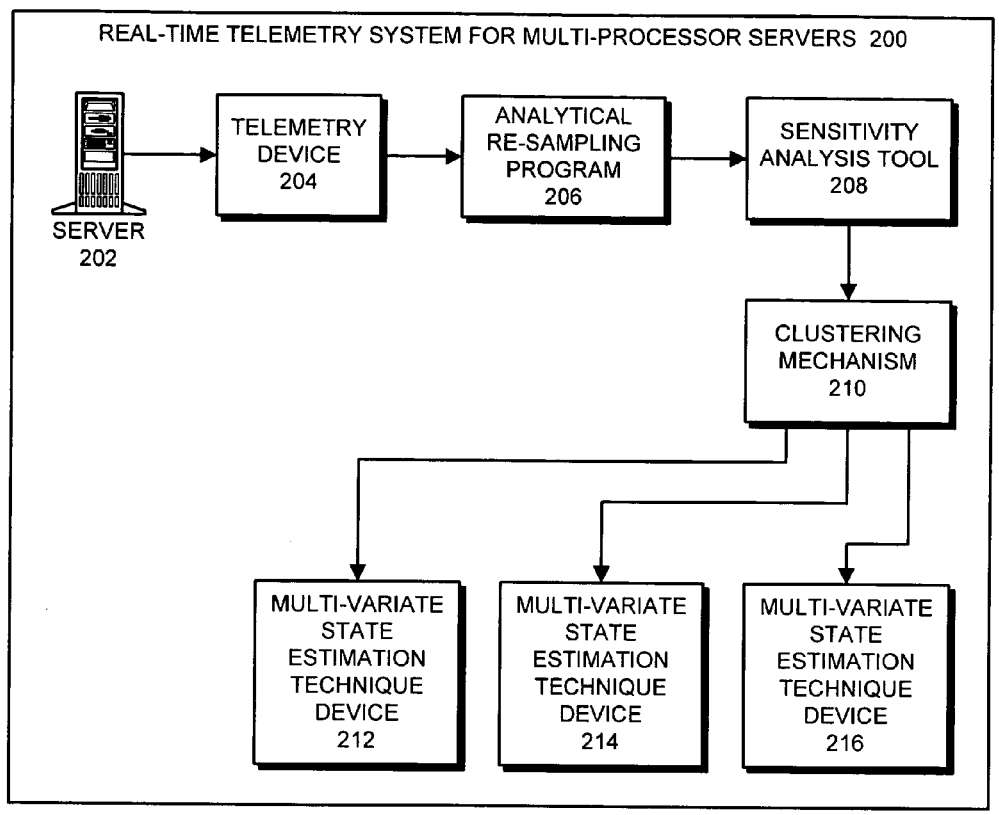
FIG. 2 illustrates a real-time telemetry system for multi-processor servers in accordance with an embodiment of the present invention.

FIG. 2 illustrates real-time telemetry system servers 200 in accordance with an embodiment of the present invention. While real-time telemetry system 100 (illustrated in FIG. 1) is effective for uniprocessor systems, some variations can be made to apply the technique to multiprocessor systems. System 200 contains server 202. Server 202 can generally include any computational node including a mechanism for servicing requests from a client for computational and/or data storage resources. In the present embodiment, server 202 is a high-end server with multiple processors that is being monitored by real-time telemetry system 100.

As in system 100 illustrated in FIG. 1, system 200 also contains telemetry device 204, analytical re-sampling program 206, sensitivity analysis tool 208, clustering mechanism 210, and MSET devices 212-216. Telemetry device 204 gathers information from the various sensors and monitoring tools that are monitoring server 202, and directs the signals to analytical re-sampling program 206. Analytical re-sampling program 206 ensures that the signals have a uniform sampling rate, using interpolation techniques, if necessary, to fill in any missing data points.

After the signals pass through analytical re-sampling program 206, they are aligned and correlated by sensitivity analysis tool 208 in the same manner as described for sensitivity analysis tool 108 above. However, in this embodiment, sensitivity analysis tool 208 works closely with clustering mechanism 210 to create one or more clusters of correlated signals to send to MSET devices 212-214. Note that any one of a large number of known clustering techniques can be used by clustering mechanism 210.

In one embodiment of the present invention, clustering mechanism 210 works closely with sensitivity analysis tool 208 and the alignment and clustering operations are performed at the same time. In another embodiment of the present invention, sensitivity analysis tool 208 performs the alignment operation first, before clustering mechanism divides the signals into clusters.

Because server 202 is a multi-processor server, and each processor generally works independently of the others, the probability is high that there will be very little correlation between the signals generated from the monitoring different processors. While the signals from these different processor are not correlated, they should not be discarded. Rather than discarding the signals with little no correlation in sensitivity analysis tool 208, clustering mechanism 210 divides the signals into correlated clusters of signals that correspond to the different processors in server 202.

Each cluster of correlated signals is sent to a different MSET device. Note that although FIG. 2 illustrates the use of three MSET devices, 212-216, in general, there can be any number of MSET devices.

Real-Time Telemetry Monitoring

Figure 3:
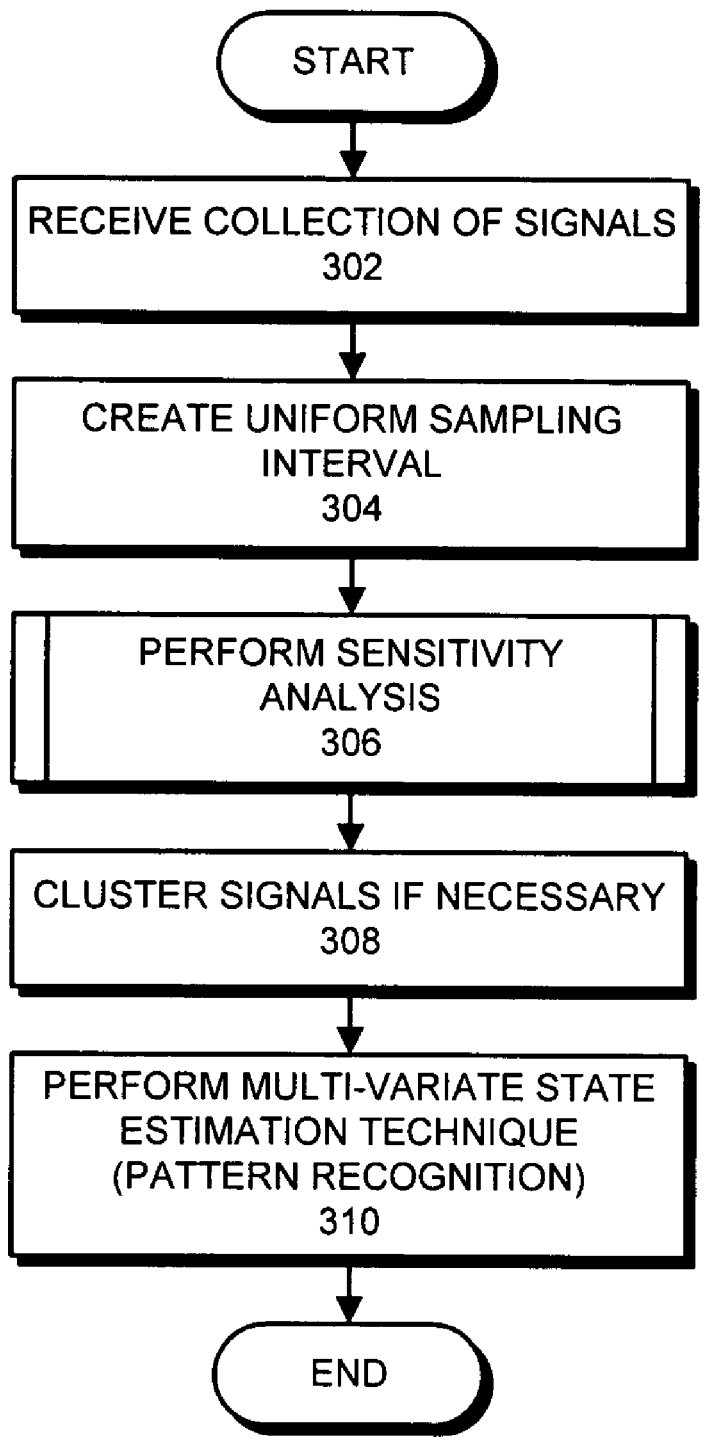
FIG. 3 presents a flowchart illustrating the process of real-time telemetry monitoring of a computer system in accordance with an embodiment of the present invention.

FIG. 3 presents a flowchart illustrating the process of real-time telemetry monitoring of a computer system in accordance with an embodiment of the present invention. The system starts by receiving a collection of telemetry signals (step 302). Next, the system uses analytical re-sampling program 206 to create a uniform sampling interval for each signal by using interpolation techniques, if necessary, to fill in any missing data points. (step 304). Once the uniform sampling interval has been created, the system uses sensitivity analysis tool 208 to align the signals in a manner that optimizes the correlation between signals (step 306). Sensitivity analysis tool 208 also combines the signals into one signal, or cluster of signals, for subsequent MSET analysis.

If one embodiment of the present invention the system employs clustering mechanism 210, which works with sensitivity analysis tool 208, to arrange the signals into correlated clusters (step 308). Finally, the system performs an MSET on the combined signal, or on combined clusters of signals if clustering mechanism 210 is employed (step 310). The MSET uses pattern recognition to determine if any of the individual signals in the component signal are faulty. A faulty signal can indicate a component failure or an impending component failure in server 202.

Sensitivity Analysis

Figure 4:
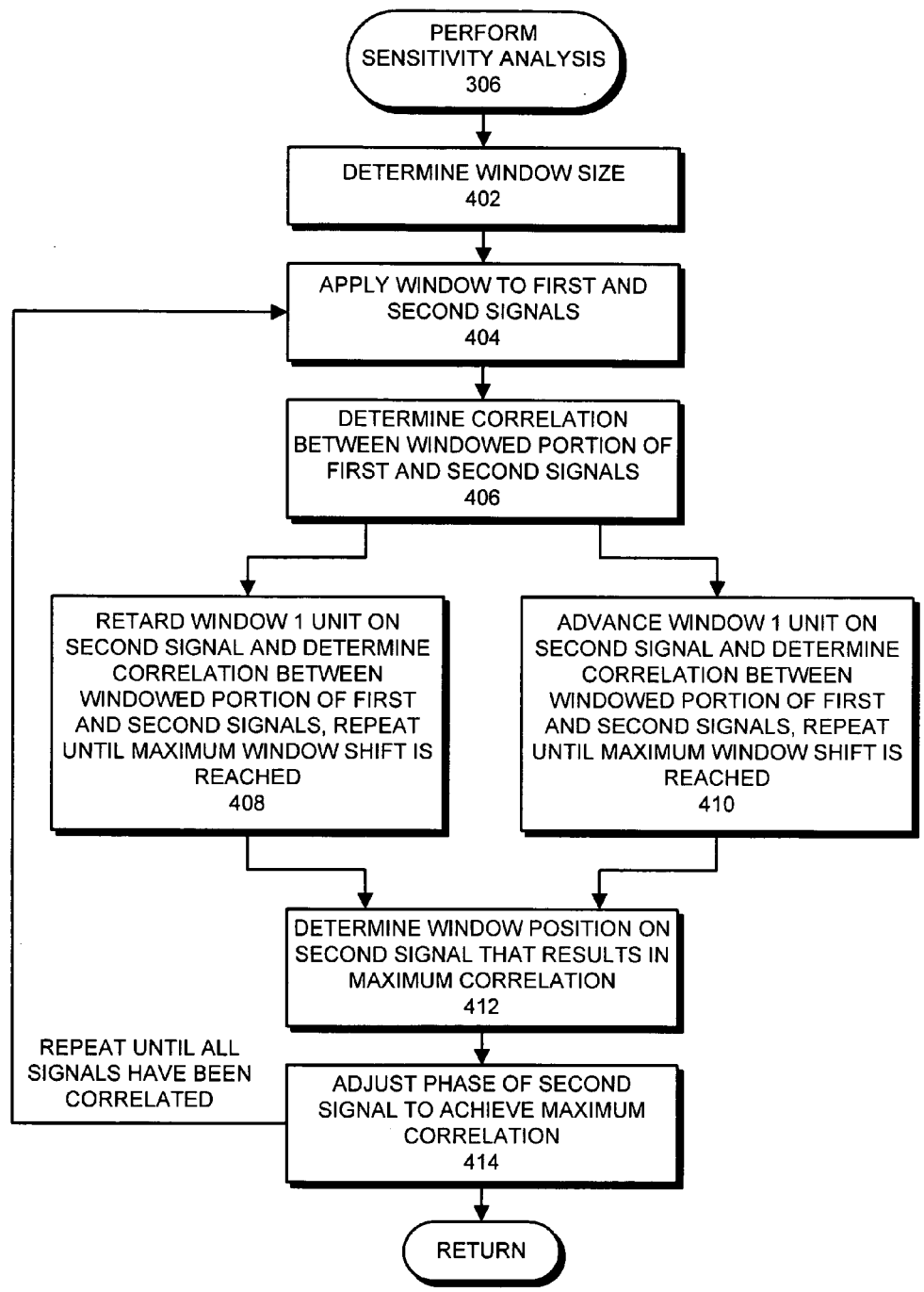
FIG. 4 presents a flowchart illustrating the process of sensitivity analysis in accordance with an embodiment of the present invention.

FIG. 4 presents a flowchart illustrating the process of sensitivity analysis in accordance with an embodiment of the present invention. The system performs sensitivity analysis by first determining a window size (step 402). Next, the window is applied to the first and second signals (step 404). The system also determines the coefficient of correlation, or F-statistic, between the first and second signals (step 406). The system then retards the window 1 unit from the base position on the second signal and determines the coefficient of correlation between the first and second signals (step 408). The system continues to retard the window by 1 additional unit and measure the correlation between the signals until the maximum window shift is reached. The system also advances the window 1 unit from the base position on the second signal and determines the coefficient of correlation between the first and second signals (step 410). The system continues to advance the window by 1 additional unit and measure the correlation between the signals until the maximum window shift is reached. Note that the window size, unit size, and maximum window shift are implementation variables and can be tuned for optimal performance.

Once all of the correlations have been computed, the system identifies the window position that resulted in maximum correlation (step 412). The system then adjusts the alignment of the second signal to achieve maximum correlation between the two signals.

Steps 404 to 414 are repeated for every signal in the set of signals. At this point, the system may discard signals with near perfect correlation, indicating that they are measuring the same metric. The system may also discard signals with virtually no correlation, because they are of little use in generating predictions for signals. The signals are also combined into one signal, or a cluster of signals, for the subsequent pattern recognition process.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for aligning a first signal to optimize correlation with a second signal, the method comprising:

receiving a set of signals including the first signal and the second signal, wherein the set of signals is related to computer system performance parameters;

determining a correlation between the first signal and the second signal to facilitate reducing downtime of a computer system;

performing an alignment adjustment to the second signal to adjust a relative alignment between the first signal and the second signal;

determining a correlation between the first signal and the second signal with the alignment adjustment;

determining if the correlation is greater with the alignment adjustment; and if the correlation is greater with the alignment adjustment, adjusting the alignment of the second signal.

2. The method of claim 1, further comprising combining the first signal and the second signal into a combined signal.

3. The method of claim 1, wherein the first signal comprises a combination of signals that have been aligned to optimize correlation.

4. The method of claim 3, further comprising removing a signal from the combination of signals that has the lowest correlation with other signals in the combination of signals.

5. The method of claim 4, further comprising re-optimizing the correlation of each signal in the combination of signals with other signals in the combination of signals.

6. The method of claim 3, further comprising predicting an individual signal in the combination of signals by using a correlation of the individual signal with other signals in the combination of signals to predict the individual signal.

7. The method of claim 6, further comprising:

measuring the individual signal;

comparing the measured individual signal with the predicted individual signal; and determining that the individual signal is faulty if the measured individual signal does not substantially match the predicted individual signal.

8. The method of claim 7, further comprising predicting failure of a component within the computer system when a signal generated by the component is determined to be faulty.

9. The method of claim 3, further comprising discarding a signal that is completely correlated with another signal in the combination of signals.

10. The method of claim 1, wherein prior to determining a correlation between the first and second signals, the method further comprises performing an analytical re-sampling operation, which uses interpolation to add data points to the first and/or second signal to ensure that each signal has the same number of data points.

11. The method of claim 1, wherein determining the correlation between the first signal and the second signal involves correlating a window of data points from the first signal with a window of data points from the second signal; and wherein the process of adjusting the alignment involves sliding the window along the second signal, until correlation is maximized with the window for the first signal.

12. The method of claim 11, further comprising adjusting the size of the fixed window and/or the sliding window.

13. A computer-readable storage medium storing instructions that when executed by a computer cause the computer to perform a method for aligning a first signal to optimize correlation with a second signal, the method comprising:

receiving a set of signals including the first signal and the second signal wherein the set of signals is related to computer system performance parameters;

determining a correlation between the first signal and the second signal to facilitate reducing downtime of a computer system;

performing an alignment adjustment to the second signal to adjust a relative alignment between the first signal and the second signal; determining a correlation between the first signal and the second signal with the alignment adjustment;

determining if the correlation is greater with the alignment adjustment; and if the correlation is greater with the alignment adjustment, adjusting the alignment of the second signal.

14. The computer-readable storage medium of claim 13, wherein the method further comprises combining the first signal and the second signal into a combined signal.

15. The computer-readable storage medium of claim 14, wherein the first signal comprises a combination of signals that have been aligned to optimize correlation.

16. The computer-readable storage medium of claim 15, wherein the method further comprises removing a signal from the combination of signals that has the lowest correlation with other signals in the combination of signals.

17. The computer-readable storage medium of claim 16, wherein the method further comprises re-optimizing the correlation of each signal in the combination of signals with other signals in the combination of signals.

18. The computer-readable storage medium of claim 15, wherein the method further comprises predicting an individual signal in the combination of signals by using a correlation of the individual signal with other signals in the combination of signals to predict the individual signal.

19. The computer-readable storage medium of claim 18, wherein the method further comprises:

measuring the individual signal;

comparing the measured individual signal with the predicted individual signal; and determining that the individual signal is faulty if the measured individual signal does not substantially match the predicted individual signal.

20. The computer-readable storage medium of claim 19, wherein the method further comprises predicting failure of a component within the computer system when a signal generated by the component is determined to be faulty.

21. The computer-readable storage medium of claim 15, wherein the method further comprises discarding a signal that is completely correlated with another signal in the combination of signals.

22. The computer-readable storage medium of claim 13, wherein prior to determining a correlation between the first and second signals, the method further comprises performing an analytical re-sampling operation, which uses interpolation to add data points to the first and/or second signal to ensure that each signal has the same number of data points.

23. The computer-readable storage medium of claim 13, wherein determining the correlation between the first signal and the second signal involves correlating a window of data points from the first signal with a window of data points from the second signal; and wherein the process of adjusting the alignment involves sliding the window along the second signal, until correlation is maximized with the window for the first signal.

24. The computer-readable storage medium of claim 23, wherein the method further comprises adjusting the size of the fixed window and/or the sliding window.

25. An apparatus for aligning a first signal to optimize correlation with a second signal, comprising:
- a receiving mechanism configured to receive a set of signals including the first signal and the second signal, wherein the set of signals is related to computer system performance parameters;
- a correlation mechanism configured to determine a correlation between the first signal and the second signal to facilitate reducing downtime of a computer system;
- an adjustment mechanism configured to perform an alignment adjustment to the second signal to adjust a relative alignment between the first signal and the second signal;
- wherein the correlation mechanism is configured to determine a correlation between the first signal and the second signal with the alignment adjustment; and
- a comparison mechanism configured to determine if the correlation is greater with the alignment adjustment;
- wherein the adjustment mechanism is configured to adjust the alignment of the second signal if the correlation is greater with the alignment adjustment.

26. The apparatus of claim 25, further comprising a combination mechanism configured to combine the first signal and the second signal into a combined signal.

27. The apparatus of claim 25, wherein the first signal comprises a combination of signals that have been aligned to optimize correlation.

28. The apparatus of claim 27, further comprising a removal mechanism configured to remove a signal from the combination of signals that has the lowest correlation with other signals in the combination of signals.

29. The apparatus of claim 28, further comprising a re-optimization mechanism configured to re-optimizing the correlation of each signal in the combination of signals with other signals in the combination of signals.

30. The apparatus of claim 27, further comprising a prediction mechanism configured to predict an individual signal in the combination of signals by using a correlation of the individual signal with other signals in the combination of signals to predict the individual signal.

31. The apparatus of claim 30, further comprising:
- a measuring mechanism configured to measure the individual signal;
- a performance mechanism configured to compare the measured individual signal with the predicted individual signal; and
- a fault-determination mechanism configured to determine that the individual signal is faulty if the measured individual signal does not substantially match the predicted individual signal.

32. The apparatus of claim 31, further comprising a component-failure mechanism configured to predict failure of a component within the computer system when a signal generated by the component is determined to be faulty.

33. The apparatus of claim 27, further comprising a discarding mechanism configured to discard a signal that is completely correlated with another signal in the combination of signals.

34. The apparatus of claim 25, further comprising a re-sampling mechanism configured to perform an analytical re-sampling operation, which uses interpolation to add data points to the first and/or second signal to ensure that each signal has the same number of data points.

35. The apparatus of claim 25,
- wherein the correlation mechanism is configured to determine a correlation between a window of data points from the first signal with a window of data points from the second signal; and
- wherein the adjustment mechanism is configured to slide the window along the second signal, until correlation is maximized with the window for the first signal.

36. The apparatus of claim 35, wherein the first and second adjustment mechanisms are further configured to adjust the size of the fixed window and/or the sliding window.

* * * * *